United States Patent [19]
Tanaka

[11] Patent Number: 6,094,314
[45] Date of Patent: Jul. 25, 2000

[54] ZOOM LENS SYSTEM

[75] Inventor: Kazuyuki Tanaka, Chofu, Japan

[73] Assignee: Olympus Optical Co., Ltd., Tokyo, Japan

[21] Appl. No.: 08/979,344

[22] Filed: Nov. 26, 1997

[30] Foreign Application Priority Data

Nov. 28, 1996 [JP] Japan .................................. 8-317706

[51] Int. Cl.$^7$ ............................................. G02B 15/14
[52] U.S. Cl. ........................................ 359/689; 359/691
[58] Field of Search .................................. 359/691, 686, 359/687, 688, 689

[56] References Cited

U.S. PATENT DOCUMENTS

| 5,268,790 | 12/1993 | Chen ........................................ 359/558 |
| 5,731,914 | 3/1998 | Meyers ..................................... 359/742 |
| 5,745,301 | 4/1998 | Betensky et al. ........................ 359/689 |
| 5,768,030 | 6/1998 | Estelle ..................................... 359/691 |
| 5,796,514 | 8/1998 | Chipper ................................... 359/354 |
| 5,875,059 | 2/1999 | Estelle ..................................... 359/682 |

OTHER PUBLICATIONS

Toshiro et al., "Zoom Lens", Patent Abstracts of Japan, 06011650, Jan. 1994.

Inanobe et al., "Variable Power Lens", Patent Abstracts of Japan, 2–56515, Feb. 1990.

Swanson, "Binary Optics Technology", Lincoln Laboratory, .M41, .L741, No. 914, pp. iii–27, Mar. 1991.

Primary Examiner—Georgia Epps
Assistant Examiner—Michael A Lucas
Attorney, Agent, or Firm—Pillsbury Madison & Sutro LLP

[57] ABSTRACT

The invention provides a zoom lens system which, albeit comprising an extremely reduced number of lenses, is well corrected for various aberrations. The zoom lens system comprises at least a negative lens group G1 and a first positive lens group G2. A second positive lens group G3 is located between the first positive lens group G1 and an image side of the system, said group G3 including at least one surface having diffractive action substantially rotationally symmetric with respect to an optical axis of the system. For zooming, at least a spacing between the negative lens group G1 and the first positive lens group G2 is changed. The system further satisfies a specific condition for making correction for longitudinal chromatic aberration, and a specific condition for making correction for chromatic aberration of magnification.

4 Claims, 5 Drawing Sheets

ZOOM LENS SYSTEM

BACKGROUND OF THE INVENTION

The present invention relates generally to a zoom lens system, and more particularly to a zoom lens system used on electronic cameras, video cameras, etc.

Lens systems used on electronic or video cameras, for instance, are required to have not only a reduced size but also a long-enough back focus so as to locate low-pass or color filters just in front of their image planes.

For zoom lenses of simple construction used on electronic or video cameras, etc., it has so far been general to use a so-called two-group zoom lens system comprising, in order from the object side, a first lens group having negative power and a second lens group having positive power so as to make sure of a back focus. To reduce fluctuations of chromatic aberrations due to zooming, however, it is required to introduce achromatization in each group. Thus, each group should be constructed of many lenses. For example, JP-A 6-11650 discloses a two-group zoom lens system that has an F-number of 3.3 to 4.7 and a zoom ratio of 1.8, and comprises seven lenses.

A zoom lens system has its focal length varying with a spacing change between lens groups. At the same time, there are changes of the height and angle of incident light rays on lenses, which result in fluctuations of aberrations. To reduce fluctuations of aberrations, especially longitudinal chromatic aberration and chromatic aberration of magnification, many lenses are used in each lens group.

Higher image qualities may be achieved by use of many lenses. However, this renders it difficult to achieve size, weight, and cost reductions.

A typical zoom lens system using aspheric surfaces to reduce the number of lenses involved is disclosed in JP-A 6-11650 mentioned above. The aspheric surface is a sort of means effective for making correction for spherical aberration, coma, and distortion, but can make no direct correction for chromatic aberrations. In addition, this zoom lens system still uses as many as seven lenses. Even when the number of lenses involved is reduced by use of aspheric surfaces, it is indeed difficult to achieve size, weight, and cost reductions because it is still impossible to eliminate chromatic aberrations.

Another zoom lens system designed to reduce the number of lenses by using a gradient index type lens, for instance, is disclosed in JP-A 2-56515. However, the gradient index type lens is generally difficult to fabricate.

SUMMARY OF THE INVENTION

In view of the aforesaid problems with conventional zoom lens systems, therefore, an object of the present invention is to provide a zoom lens system which, albeit comprising an extremely reduced number of lenses, is well corrected for various aberrations.

According to one aspect of the present invention, such an object is achieved by the provision of a zoom lens system which, in order from an object side of said system, comprises at least a negative lens group, and a positive lens group comprising at least one positive lens and an optical element located between said positive lens and an image side of said system and including at least one surface having diffractive action substantially rotationally symmetric with respect to an optical axis of said system, and in which at least a spacing between said negative lens group and said positive lens group is varied for zooming.

According to another aspect of the present invention, there is provided a zoom lens system which, in order from an object side of said system, comprises at least a negative lens group and a first positive lens group and further includes a second positive lens group located between said first positive lens group and an image side of said system and including at least one surface having diffractive action substantially rotationally symmetric with respect to an optical axis of said system, and in which at least a spacing between said negative lens group and said first positive lens group is varied for zooming.

Preferably in the second aspect of the present invention, the following conditions (1) and (2) are satisfied to make good correction for chromatic aberrations.

$$0.02 \leq f_3/(v_2 f_2) \leq 0.4 \tag{1}$$

$$-25 \leq v_1 - v_2 \leq 20 \tag{2}$$

where $f_2$ is a focal length of the first positive lens group, $f_3$ is a focal length of the surface having a diffractive action, $v_1$ is an equivalent Abbe number of the negative lens group, and $v_2$ is an equivalent Abbe number of the first positive lens group.

More preferably, the following condition (3) is satisfied to increase a diffraction efficiency at the surface having diffractive action.

$$-1 < F/L < 1 \tag{3}$$

where F is a focal length of the overall lens system, and L is a distance from an exit pupil position to the surface having diffractive action.

To make satisfactory correction for chromatic aberrations in a simple arrangement, it is also preferred that the negative lens group consists of one negative lens and the first lens group consists of one positive lens with a spacing between the negative lens and the positive lens varied for zooming, and conditions (1) and (2).

$$0.02 \leq f_3/(v_2 f_2) \leq 0.4 \tag{1}$$

$$-25 \leq v_1 - v_2 \leq 20 \tag{2}$$

are satisfied where $f_2$ is a focal length of the first positive lens group, $f_3$ is a focal length of the surface having a diffractive action, $v_1$ is an equivalent Abbe number of the negative lens group, and $v_2$ is an equivalent Abbe number of the first positive lens group.

In what follows, reference is made to the reasons for using the aforesaid arrangements in the present invention, and the advantages thereof.

When a diffractive optical element (DOE for short) or surface having a diffractive action is used in place of an ordinary refractive type lens, it has a negative Abbe number of −3.45. It is thus possible to achieve achromatization with a refractive type lens having positive power and a DOE having positive power. The DOE can make correction for chromatic aberrations without having strong power, because its dispersion is strong. In addition, a small change in the height or angle of light rays incident on the DOE surface results in a large chromatic aberration change.

Referring here to a zoom lens system comprising a negative lens group and a positive lens group in order from its object side, longitudinal chromatic aberration is primarily produced at the positive lens group having the strongest power when the number of lenses forming each lens group is very small. To make correction for this longitudinal chromatic aberration, a refractive type lens having negative power is usually located in the vicinity of a positive lens at which the height of axial marginal rays becomes large. In view fact that the whole of the rear group has a certain power, however, it is required to increase the positive power of the positive lens to make up for negative power produced at the negative lens. The increase in the power of the positive lens leads to an increase in the angle of light rays incident on the positive lens, which in turn has an adverse influence on other aberrations. To prevent the positive lens from having an excessive power, therefore, it is desired to use a lens having a DOE, at least one surface of which has very high dispersion, a negative Abbe number, and a converging action. The DOE has positive power, and so shares a part of the power of the positive lens. Consequently, the power of the positive lens becomes weak, producing a favorable influence on other aberrations.

When the DOE is moved in unison with the positive lens group at the time of zooming, a fluctuation of longitudinal chromatic aberration throughout the zoom lens system is reduced because longitudinal chromatic aberration produced at the positive lens group is corrected. If, in this case, the DOE is fixed or movable independently, it is then possible to achieve higher zoom ratios because the fluctuation of longitudinal chromatic aberration throughout the zoom lens system can be much more reduced.

Chromatic aberration of magnification is largely produced at the negative lens group at which the height of off-axis light rays becomes large and the positive lens group having strong power. To make correction for this, usually, a positive refractive type lens is located in the negative lens group at which the height of off-axis light rays becomes large, or a negative refractive type lens is located between the positive lens group at which the height of off-axis light rays becomes large and the image side of the zoom lens system. When the negative refractive type lens is located between the positive lens group and the image side, however, there are some unavoidable problems such as the lens diameter being increased because, in order for the zoom lens system to become telecentric on the image side, it is required to increase the height of light rays on an object side with respect to the negative lens.

To make correction for chromatic aberration of magnification, therefore, it is desired to use a DOE that has high action on the correction of chromatic aberrations even when it does not have a strong power. To construct a zoom lens system of a limited number of lenses, it is desired for the DOE to make simultaneous correction for both longitudinal chromatic aberration and chromatic aberration of magnification. It is thus desired that the DOE be located between the positive lens at which the height of off-axis marginal rays becomes large and the image side of the zoom lens system.

When the DOE is moved in unison with the positive lens group at the time of zooming, the height of light rays at the DOE surface changes in such a direction as to cancel chromatic aberration of magnification, so that the fluctuation of chromatic aberration of magnification can be reduced. If, in this case, the DOE is fixed or movable independently, it is then possible to achieve higher zoom ratios because the fluctuation of chromatic aberration of magnification can be much more reduced.

Condition (1) is provided to make correction for longitudinal chromatic aberration, and to standardize the focal length of the DOE in terms of the equivalent Abbe number and focal length of the positive lens group. By satisfying condition (1), the longitudinal chromatic aberration can be corrected.

In this regard, note that the equivalent Abbe number $v_j$ of a j-th group is given by $$1/v_j = \sum_{i}^{n}(1/v_{ji}f_{ji}) \times f_j$$

where $v_{ji}$ is the Abbe number of an i-th lens in the j-th group, $f_{ji}$ is the focal length of the i-th lens in the j-th group, and $f_j$ is the focal length of the j-th group.

When the upper limit of 0.4 in condition (1) is exceeded, longitudinal chromatic aberration produced at the positive lens group remains under-corrected. When the lower limit of 0.02 is not reached, the longitudinal chromatic aberration is rather over-corrected.

The longitudinal chromatic aberration can be better corrected by satisfying the following condition (4):

$$0.08 \leq f_3/(v_2 f_2) \leq 0.18 \tag{4}$$

Condition (2) is provided to make correction for chromatic aberration of magnification, representing a difference between the equivalent Abbe number of the negative lens group and the equivalent Abbe number of the positive lens group. The chromatic aberration of magnification can be corrected by satisfying this condition.

Unless the lower limit of −25 in condition (2) is reached, longitudinal chromatic aberration produced at the positive lens group becomes small, and so the power of the DOE becomes weak. Consequently, chromatic aberration of magnification produced at the negative lens group remains under-corrected. With the upper limit of 20 exceeded, to the contrary, longitudinal chromatic aberration produced at the positive lens group becomes large. Then, the power of the DOE becomes strong to make correction for this, resulting in over-correction of the chromatic aberration of magnification.

The chromatic aberration of magnification can be better corrected by satisfying the following condition (5):

$$-15 \leq v_1 - v_2 \leq 10 \tag{5}$$

Figure 8A:
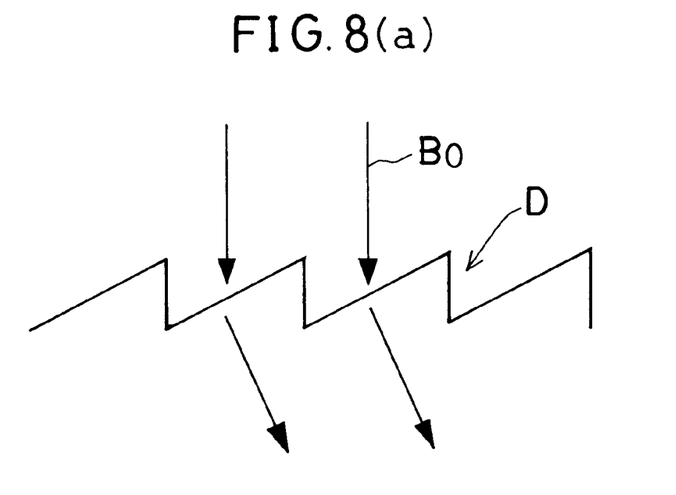
Figure 8B:
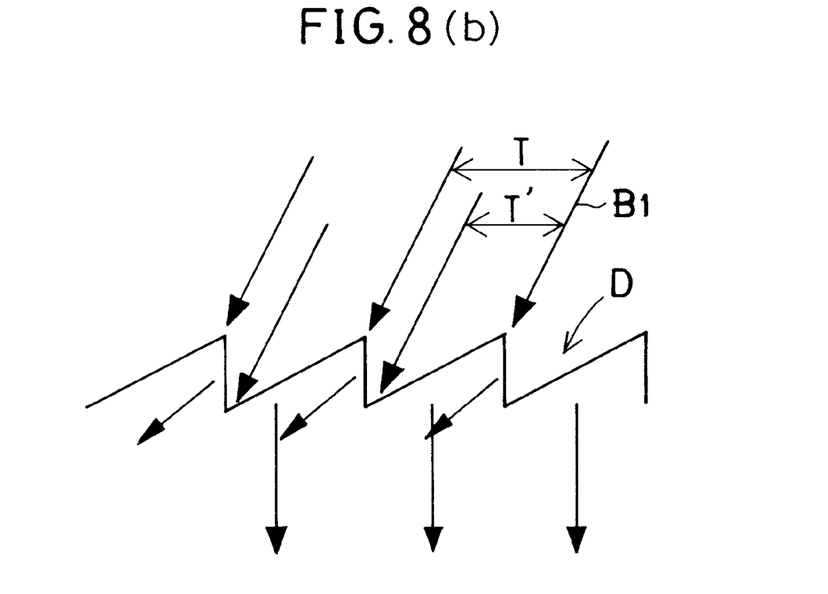

Just as it is important to increase the transmittance of a lens vitreous material, it is imperative to increase the diffraction efficiency of the DOE. To increase the diffraction efficiency at the DOE surface, it is desired that all light rays striking on the DOE surface have the same angle of incidence. When, for instance, an axial light beam $B_0$ is vertically incident on a DOE surface D, as shown in FIG. 8(a), a diffraction efficiency of 100% can be obtained with respect to a particular wavelength. If, as shown in FIG. 8(b), an off-axis light beam $B_1$ is obliquely incident on the DOE surface D, however, a width T' of the light beam subjected to diffraction is smaller than a width T of the incident light beam, resulting in a diffraction efficiency drop. T'/T is called a duty ratio, and a diffraction efficiency $\eta_1$ upon oblique incidence of light is approximated by the following approximate expression (6):

$$\eta_1 \approx (T'/T)\eta_0 \tag{6}$$

where $\eta_0$ is a diffraction efficiency upon vertical incidence of light, as described in Gray J. Swanson, "Binary Optics Technology: Theoretical Limits on the Diffraction Efficiency of Multilevel Diffractive Optical Elements", Lincoln Laboratory, MIT Tech., Report TR-914.

Upon the oblique incidence of light on the DOE, not only does the diffraction efficiency drop, but also other light beams except the light beam of width T' diffract, reflect or scatter in other directions, resulting in flares on the whole picture plane and so image quality drops. To keep the diffraction efficiency in a good state, it is thus desired that such off-axis light beams, too, be substantially vertically incident on the DOE. To this end, it is desired that the DOE be positioned away from the exit pupil, and that the DOE be located between the first positive lens group where changes in the angle of incidence of light rays due to zooming are reduced and the image side of the zoom lens system.

Condition (3) is provided to standardize the distance of the optical system from the exit pupil position to the DOE in terms of the focal length of the optical system, such that.

$$-1 < F/L < 1 \qquad (3)$$

where F is the focal length of the overall zoom lens system, and L is the distance from the exit pupil position to the DOE.

When the upper limit of 1 in condition (3) is exceeded or when the lower limit of −1 is not reached, off-axis beams are obliquely incident on the ODE, resulting in diffraction efficiency drops.

When the positive lens is located nearest to the object side to obtain large zoom ratios, it is preferable to locate the DOE in the vicinity of that positive lens because there is an increase in the chromatic aberration of magnification.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8($a$) illustrates the diffraction efficiency of an axial light beam incident on the DOE surface, and FIG. 8($b$) illustrates the diffraction of an off-axis light beam incident on the DOE surface.

DESCRIPTION OF THE PREFERRED EMBODIMENTS

Examples 1 to 7 of the zoom lens system according to the present invention will now be described with reference to FIGS. 1 to 7. Numerical data in each example will be enumerated later. Each of DOEs in the lens systems of the present invention is designed according to the ultra-high index method. More illustratively, the diffractive surface is expressed as a refractive type lens that is of nil thickness and has a refractive index of 1001 at a d-line wavelength. In the numerical data to be set out later, therefore, the diffractive surface is represented by such an ordinary aspherical expression as given just below. That is, now suppose an optical axis direction to be defined as a Z-axis and a direction vertical thereto to be defined as a Y-axis. Then, the aspheric surface is given by $$Z = CY^2/[1+\sqrt{1-(1+K)C^2Y^2}] + A_4Y^4 + A_6Y^6 + A_8Y^8 + A_{10}Y^{10} \qquad (7)$$

where C is the curvature of the apex of the surface (=1/r; r is the radius of curvature), K is an conical coefficient, and $A_4$, $A_6$, $A_8$ and $A_{10}$ are fourth, sixth, eighth and tenth aspherical coefficients.

It is a surface of the substrate of the DOE that comes in contact with the diffractive surface at nil thickness. In actual DOE fabrication, a phase change is first found from a difference between the aspheric shape of the diffractive surface and the shape of the substrate surface, and the refractive indices thereof. Then, this phase change is converted by calculation to a diffraction grating pitch to form a diffraction grating on the substrate surface. In short, it is the surface of the substrate that acts finally as a lens in each example to be described just below.

Figure 1:
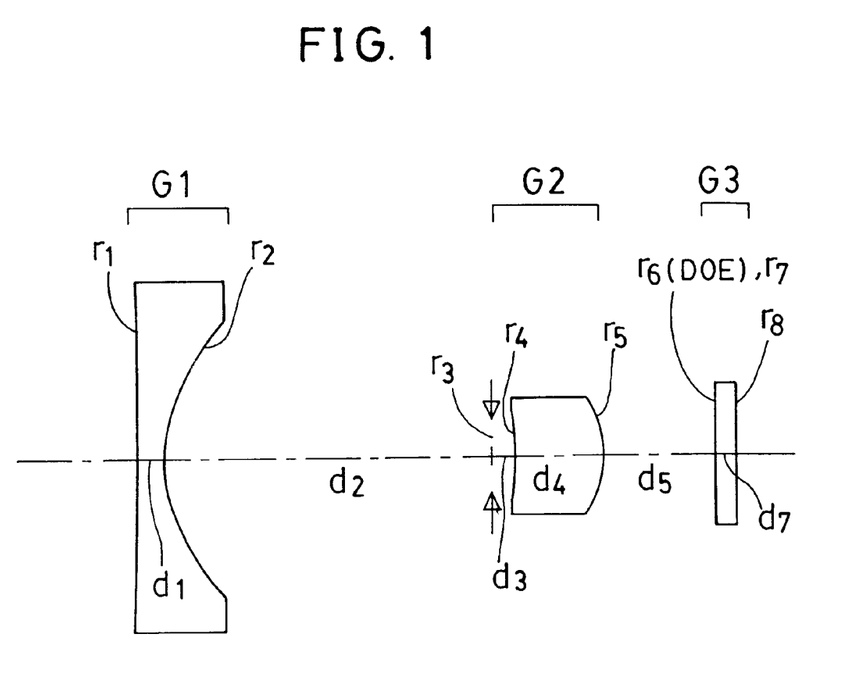
FIG. 1 is a sectional schematic of Example 1 of the zoom lens system according to the present invention at an intermediate focal length.

FIG. 1 is a sectional schematic of Example 1 of the zoom lens system at an intermediate focal length. Example 1 is made up of a movable first group G1 consisting of one double-concave lens, a movable second group G2 consisting of a stop located on an object side thereof and one positive meniscus lens convex on an image side thereof, and a fixed third group G3 consisting of a plane-parallel plate and a DOE having positive power and located on a surface of the plane-parallel plate that faces the object side. Three aspheric surfaces are provided, one for a surface of the double-concave lens that faces the image side, one for a surface of the positive meniscus lens that faces the object side, and one for the DOE.

Figure 2:
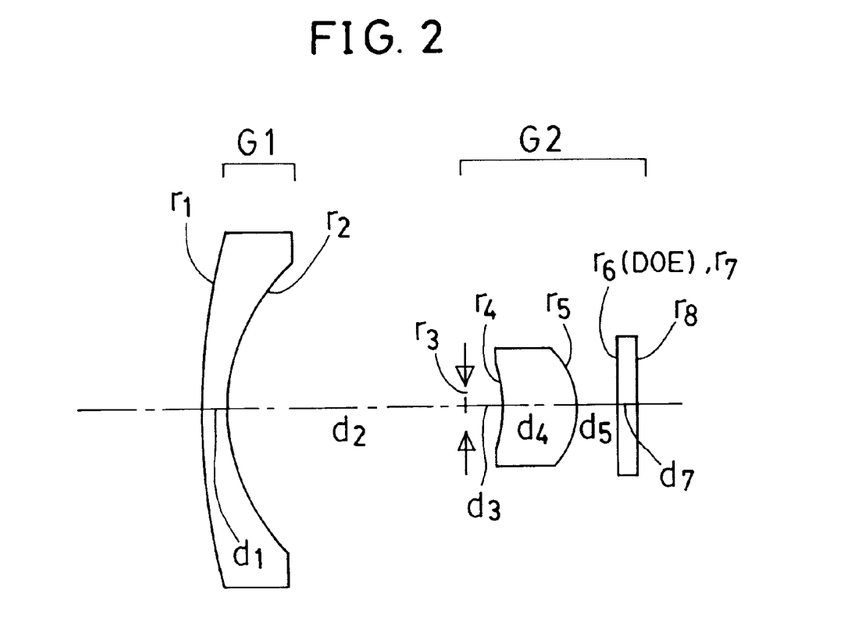
FIG. 2 is a sectional schematic of Example 2 of the zoom lens system according to the present invention at an intermediate focal length.

FIG. 2 is a sectional schematic of Example 2 of the zoom lens system at an intermediate focal length. Example 2 is made up of a movable first group G1 consisting of one negative meniscus lens convex on an object side thereof, and a movable second group G2 consisting of a stop located on the object side, a positive meniscus lens convex on an image side thereof, a plane-parallel plate and a DOE having positive power and located on a surface of the plane-parallel plate that faces the object side. Three aspheric surfaces are provided, one for a surface of the negative meniscus lens that faces the image side, one for a surface of the positive meniscus lens that faces the object side, and one for the DOE.

Figure 3:
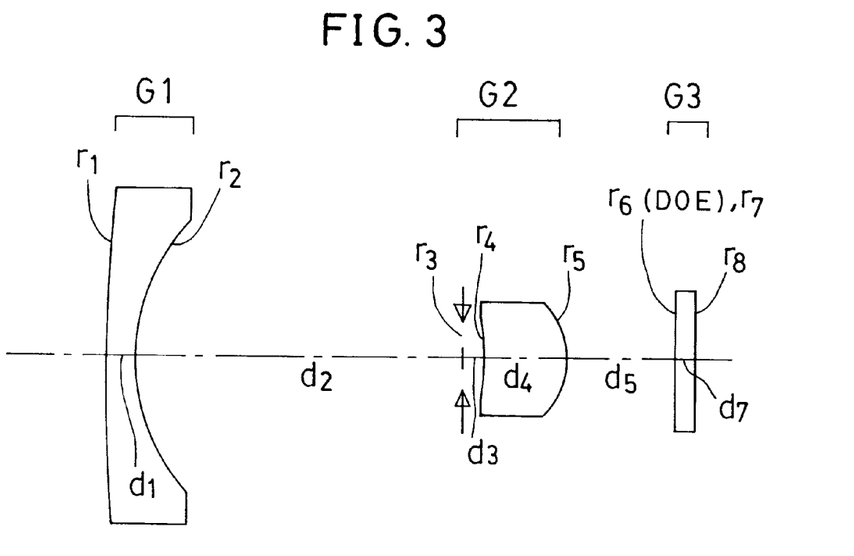
FIG. 3 is a sectional schematic of Example 3 of the zoom lens system according to the present invention at an intermediate focal length.

FIG. 3 is a sectional schematic of Example 3 of the zoom lens system at an intermediate focal length. Example 3 is made up of a movable first group G1 consisting of one negative meniscus lens convex on an object side thereof, a movable second group G2 consisting of a stop located on the object side and one positive meniscus lens convex on an image side thereof, and a fixed third group G3 consisting of a plane-parallel plate and a DOE having positive power and located on a surface of the plane-parallel plate that faces the object side. Three aspheric surfaces are provided, one for a surface of the negative meniscus lens that faces the image side, one for a surface of the positive meniscus lens that faces the object side, and one for the DOE.

Figure 4:
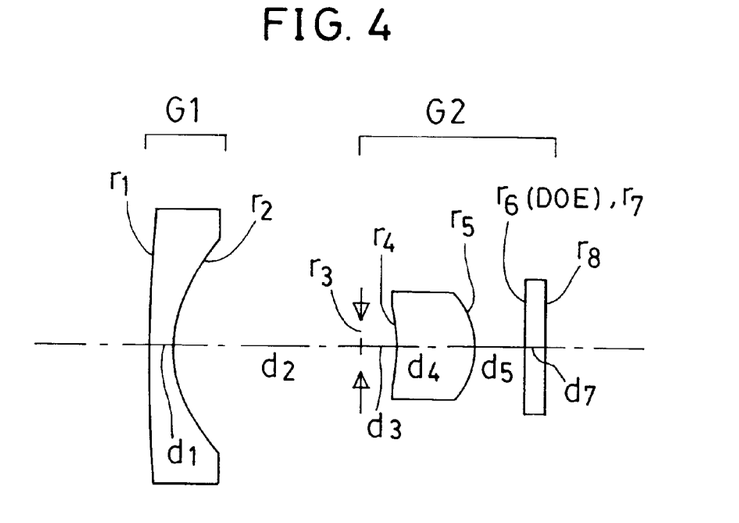
FIG. 4 is a sectional schematic of Example 4 of the zoom lens system according to the present invention at an intermediate focal length.

FIG. 4 is a sectional schematic of Example 4 of the zoom lens system at an intermediate focal length. Example 4 is made up of a movable first group G1 consisting of one negative meniscus lens convex on an object side thereof, and a movable second group G2 consisting of a stop located on the object side, a positive meniscus lens convex on an image side thereof, a plane-parallel plate and a DOE having positive power and located on a surface of the plane-parallel plate that faces the object side. Three aspheric surfaces are provided, one for a surface of the negative meniscus lens that faces the image side, one for a surface of the positive meniscus lens that faces the object side, and one for the DOE.

Figure 5:
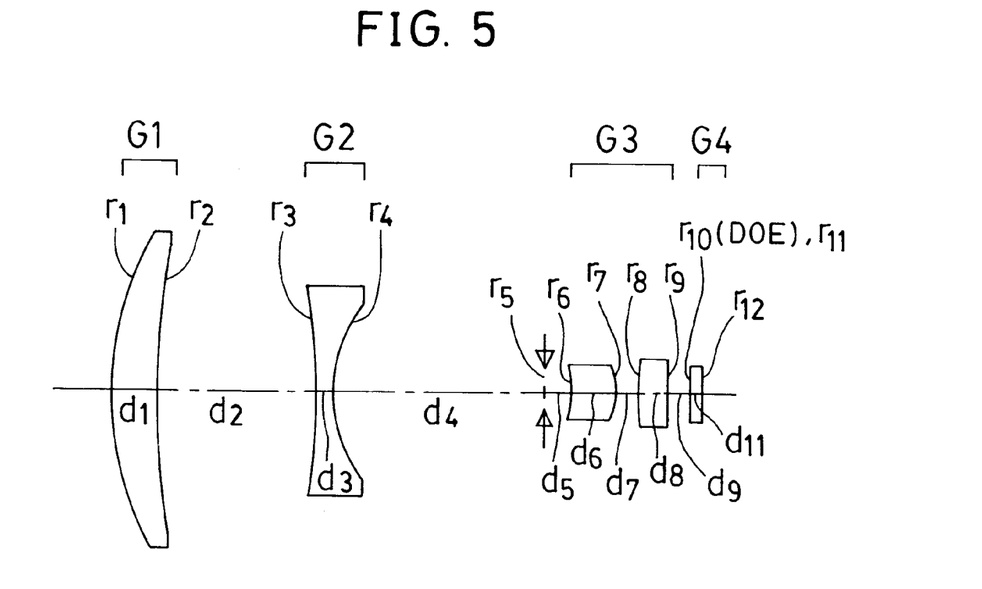
FIG. 5 is a sectional schematic of Example 5 of the zoom lens system according to the present invention at an intermediate focal length.

FIG. 5 is a sectional schematic of Example 5 of the zoom lens system at an intermediate focal length. Example 5 is made up of a movable first group G1 consisting of one positive meniscus lens convex on an object side thereof, a movable second group G2 consisting of one double-concave lens, a movable third group G3 consisting of a movable stop, one positive meniscus lens convex on an image side thereof and one positive meniscus lens convex on the object side, and a movable fourth group G4 consisting of a plane-parallel plate and a DOE having positive power and located on a surface of the plane-parallel plate that faces the object side. Three aspheric surfaces are provided, one for a surface of the double-concave lens in the second group G2 that faces the image side, one for a surface of the positive meniscus lens in the third group G3 that faces the object side, and one for the DOE.

Figure 6:
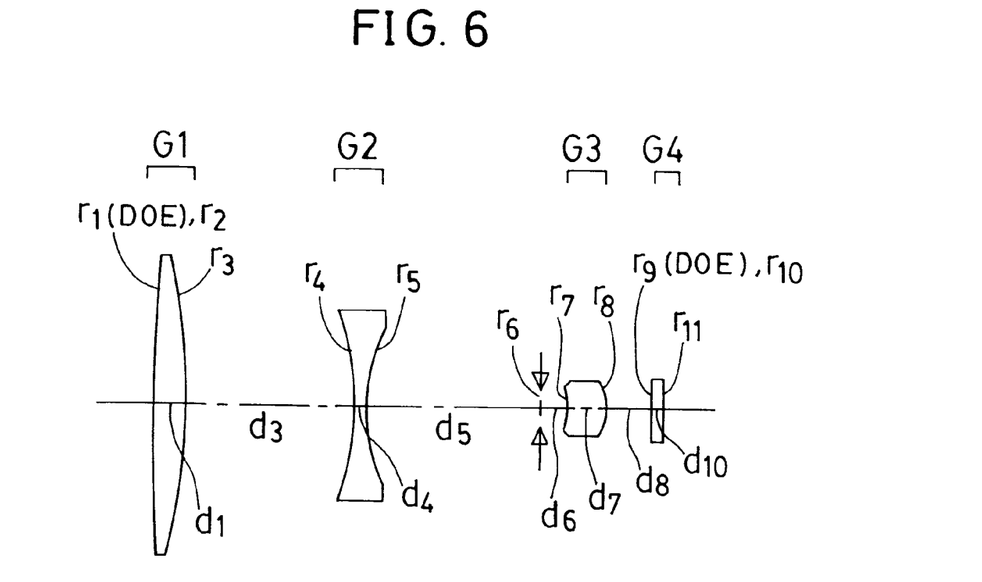
FIG. 6 is a sectional schematic of Example 6 of the zoom lens system according to the present invention at an intermediate focal length.

FIG. 6 is a sectional schematic of Example 6 of the zoom lens system at an intermediate focal length. Example 6 is made up of a movable first group G1 consisting of one double-convex lens and a DOE having positive power and located on a surface of the double-convex lens that faces the object side, a movable second group G2 consisting of one double-concave lens, a movable third group G3 consisting of a movable stop and one positive meniscus lens convex on an image side thereof, and a movable fourth group G4 consisting of a plane-parallel plate and a DOE having positive power and located on a surface of the plane-parallel plate that faces the object side. Three aspheric surfaces are provided, one for a surface of the double-concave lens in the second group G2 that faces the image side, one for a surface of the positive meniscus lens in the third group G3 that faces the object side, and one for the DOE in the fourth group G4.

Figure 7:
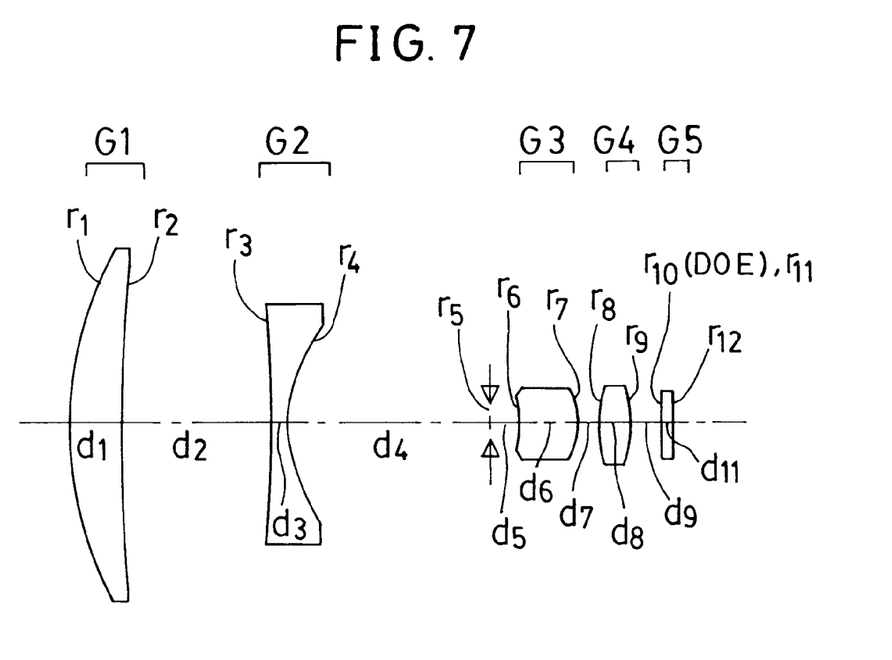
FIG. 7 is a sectional schematic of Example 7 of the zoom lens system according to the present invention at an intermediate focal length.

FIG. 7 is a sectional schematic of Example 7 of the zoom lens system at an intermediate focal length. Example 7 is made up of a movable first group G1 consisting of one positive meniscus lens convex on an object side thereof, a movable second group G2 consisting of one double-concave lens, a movable third group G3 consisting of a movable stop and one positive meniscus lens convex on an image side thereof, a movable fourth group G4 consisting of one double-convex lens, and a movable fifth group G5 consisting of a plane-parallel plate and a DOE having positive power and located on a surface of the plane-parallel plate that faces the object side. Three aspheric surfaces are provided, one for a surface of the double-concave lens in the second group G2 that faces the image side, one for a surface of the positive meniscus lens in the third group G3 that faces the object side, and one for the DOE.

Enumerated below are the numerical data in Examples 1 to 7. The symbols used hereinafter but not hereinbefore have the following meanings; f is the focal length of the overall zoom lens system, $F_{NO}$ is an F-number, $\omega$ is a half field angle, $f_B$ is a back focus, $r_1, r_2, \ldots$ are the radii of curvature of lens surfaces, $d_1, d_2, \ldots$ are the spacings between adjacent lens surfaces, $n_{d1}, n_{d2}, \ldots$ are the d-line indices of refraction of lenses, and $v_{d1}, v_{d2}, \ldots$ are the Abbe numbers of lenses.

It is noted that the aspheric shape is represented by expression (7).

Example 1

$f = 4.55 \sim 7.00 \sim 10.00$
$F_{NO} = 2.8 \sim 2.97 \sim 3.18$
$\omega = 33.9° \sim 23.6° \sim 17°$
$f_B = 9.69 \sim 9.69 \sim 9.69$ $r_1 = -206.252692$  $d_1 = 2.000000$  $n_{d1} = 1.492410$  $v_{d1} = 57.66$
$r_2 = 11.246203$ (Aspheric)  $d_2 =$ (Variable)
$r_3 = \infty$ (Stop)  $d_3 = 1.631023$
$r_4 = -51.639923$ (Aspheric)  $d_4 = 6.743478$  $n_{d2} = 1.492410$  $v_{d2} = 57.66$
$r_5 = -6.438854$  $d_5 =$ (Variable)
$r_6 = 78410.607965$ (Aspheric)  $d_6 = 0.000000$  $n_{d3} = 1001.000$  $v_{d3} = -3.453391$
$r_7 = \infty$  $d_7 = 1.500000$  $n_{d4} = 1.492410$  $v_{d4} = 57.66$
$r_8 = \infty$ Zooming Spaces

| f | 4.55 | 7.00 | 10.00 |
|---|---|---|---|
| $d_2$ | 44.3759 | 23.9531 | 12.5747 |
| $d_5$ | 5.9391 | 7.809 | 10.100 |

Aspherical Coefficients

2nd surface $K = -3.432433 \times 10^{-1}$
$A_4 = -7.083788 \times 10^{-6}$
$A_6 = -7.321164 \times 10^{-7}$
$A_8 = 4.050794 \times 10^{-9}$
$A_{10} = -1.706982 \times 10^{-11}$ 4th surface $K = 1.893336 \times 10^1$
$A_4 = -1.066922 \times 10^{-3}$
$A_6 = -2.108772 \times 10^{-5}$
$A_8 = -1.079715 \times 10^{-6}$
$A_{10} = -2.359874 \times 10^{-8}$ 6th surface $K = 6.347584 \times 10^1$
$A_4 = -3.276781 \times 10^{-8}$
$A_6 = -4.214695 \times 10^{-9}$
$A_8 = 3.071964 \times 10^{-10}$
$A_{10} = 0$

Example 2

$f = 5.7 \sim 7.00 \sim 9.00$
$F_{NO} = 2.80 \sim 2.82 \sim 2.85$
$\omega = 28.2° \sim 23.6° \sim 18.8°$
$f_B = 8.89 \sim 9.22 \sim 9.71$ $r_1 = 49.617100$  $d_1 = 2.000000$  $n_{d1} = 1.492410$  $v_{d1} = 57.66$
$r_2 = 13.542063$ (Aspheric)  $d_{d2} =$ (Variable)
$r_3 = \infty$ (Stop)  $d_3 = 2.488567$
$r_4 = -17.671258$ (Aspheric)  $d_4 = 5.732219$  $n_{d2} = 1.723420$  $v_{d2} = 37.95$
$r_5 = -6.190489$  $d_5 = 2.742124$
$r_6 = 71255.859478$ (Aspheric)  $d_6 = 0.000000$  $n_{d3} = 1001.000$  $v_{d3} = -3.453391$
$r_7 = \infty$  $d_7 = 1.500000$  $n_{d4} = -1.492410$  $v_{d4} = 57.66$
$r_8 = \infty$ Zooming Spaces

| f | 5.7 | 7.00 | 9.00 |
|---|---|---|---|
| $d_2$ | 29.5287 | 17.486 | 5.7525 |

Aspherical Coefficients

2nd surface $K = -1.516737 \times 10^{-1}$
$A_4 = 1.385374 \times 10^{-5}$
$A_6 = -1.697835 \times 10^{-8}$
$A_8 = -5.266036 \times 10^{-9}$
$A_{10} = 3.782153 \times 10^{-11}$ 4th surface $K = -1.295221$
$A_4 = -1.738955 \times 10^{-3}$ -continued $A_6 = 3.489194 \times 10^{-7}$
$A_8 = -9.707174 \times 10^{-6}$
$A_{10} = 4.839873 \times 10^{-7}$
6th surface $K = -5.665858$
$A_4 = 3.581239 \times 10^{-8}$
$A_6 = 6.469152 \times 10^{-11}$
$A_8 = 1.291338 \times 10^{-10}$
$A_{10} = 0$

Example 3

$f = 4.55 \sim 7.00 \sim 10.00$
$F_{NO} = 2.80 \sim 2.97 \sim 3.18$
$\omega = 33.9° \sim 23.6° \sim 17°$
$f_B = 9.69 \sim 9.69 \sim 9.69$ $r_1 = 172.632162$   $d_1 = 2.230566$  $n_{d1} = 1.664459$  $\nu_{d1} = 35.81$
$r_2 = 13.639534$ (Aspheric)   $d_2 = $ (Variable)
$r_3 = \infty$ (Stop)   $d_3 = 1.660682$
$r_4 = -30.892720$ (Aspheric)   $d_4 = 6.409483$  $n_{d2} = 1.492410$  $\nu_{d2} = 57.66$
$r_5 = -6.140606$   $d_5 = $ (Variable)
$r_6 = 78481.837471$ (Aspheric)   $d_6 = 0.000000$  $n_{d3} = 1001.000$  $\nu_{d3} = -3.453391$
$r_7 = \infty$   $d_7 = 1.500000$  $n_{d4} = 1.492410$  $\nu_{d4} = 57.66$
$r_8 = \infty$ Zooming Spaces

| f | 4.55 | 7.00 | 10.00 |
|---|---|---|---|
| $d_2$ | 46.4554 | 25.1017 | 13.2045 |
| $d_5$ | 6.309 | 8.124 | 10.347 |

Aspherical Coefficients

2nd surface $K = -7.941287 \times 10^{-2}$
$A_4 = -8.808001 \times 10^{-8}$
$A_6 = -5.903164 \times 10^{-7}$
$A_8 = 3.804484 \times 10^{-9}$
$A_{10} = -1.591253 \times 10^{-11}$
4th surface $K = 1.711194 \times 10^{1}$
$A_4 = -1.193943 \times 10^{-3}$
$A_6 = -2.782196 \times 10^{-5}$
$A_8 = -1.155262 \times 10^{-6}$
$A_{10} = -7.857594 \times 10^{-8}$
6th surface $K = 6.245612 \times 10^{1}$
$A_4 = -1.736043 \times 10^{-8}$
$A_6 = -3.905838 \times 10^{-9}$
$A_8 = 2.548671 \times 10^{-10}$
$A_{10} = 0$

Example 4

$f = 5.00 \sim 7.00 \sim 9.00$
$F_{NO} = 2.80 \sim 2.87 \sim 2.92$
$\omega = 31.5° \sim 23.6° \sim 18.8°$
$f_B = 9.19 \sim 10.1 \sim 11.0$ $r_1 = 92.644382$   $d_1 = 2.000000$  $n_{d1} = 1.492410$  $\nu_{d1} = 57.66$
$r_2 = 10.174730$ (Aspheric)   $d_2 = $ (Variable)
$r_3 = \infty$ (Stop)   $d_3 = 2.703972$
$r_4 = -24.280255$ (Aspheric)   $d_4 = 6.063824$  $n_{d2} = 1.670029$  $\nu_{d2} = 47.25$
$r_5 = -6.393905$   $d_5 = 3.791122$
$r_6 = 89569.502666$ (Aspheric)   $d_6 = 0.000000$  $n_{d3} = 1001.000$  $\nu_{d3} = 3.453391$
$r_7 = \infty$   $d_7 = 1.500000$  $n_{d4} = 1.492410$  $\nu_{d4} = 57.66$
$r_8 = \infty$ Zooming Spaces

| f | 5.00 | 7.00 | 9.00 |
|---|---|---|---|
| $d_2$ | 28.4191 | 14.5295 | 6.8130 |

Aspherical Coefficients

2nd surface $K = -1.633465 \times 10^{-1}$
$A_4 = 9.264610 \times 10^{-6}$
$A_6 = -3.832943 \times 10^{-7}$
$A_8 = -1.235999 \times 10^{-8}$
$A_{10} = 8.779947 \times 10^{-11}$
4th surface $K = 3.237935 \times 10^{-1}$
$A_4 = -1.424585 \times 10^{-3}$
$A_6 = -1.798425 \times 10^{-5}$
$A_8 = -2.372833 \times 10^{-7}$
$A_{10} = -3.022523 \times 10^{-7}$
6th surface $K = -3.381935$
$A_4 = 2.563489 \times 10^{-8}$
$A_6 = -4.567303 \times 10^{-9}$
$A_8 = 3.878218 \times 10^{-10}$
$A_{10} = 0$

Example 5

$f = 5.32 \sim 8.77 \sim 14.00$
$F_{NO} = 2.80 \sim 2.87 \sim 2.92$
$F_{NO} = 31.5° \sim 19.3° \sim 12.3°$
$f_B = 9.69 \sim 7.11 \sim 6.54$ $r_1 = 56.106126$   $d_1 = 6.240997$  $n_{d1} = 1.517277$  $\nu_{d1} = 69.56$
$r_2 = 315.753827$   $d_2 = $ (Variable)
$r_3 = -80.595503$   $d_3 = 2.120962$  $n_{d2} = 1.571351$  $\nu_{d2} = 52.97$
$r_4 = 15.949552$ (Aspheric)   $d_4 = $ (Variable)
$r_5 = \infty$ (Stop)   $d_5 = $ (Variable)
$r_6 = -32.317877$ (Aspheric)   $d_6 = 6.513228$  $n_{d3} = 1.503779$  $\nu_{d3} = 66.81$
$r_7 = -6.3206$   $d_7 = 2.835058$
$r_8 = 74.2703$   $d_8 = 3.733473$  $n_{d4} = 1.740769$  $\nu_{d4} = 27.79$
$r_9 = 101.141092$   $d_9 = $ (Variable)
$r_{10} = 99830.477$ (Aspheric)   $d_{10} = 0.000000$  $n_{d5} = 1001.000$  $\nu_{d5} = -3.453391$
$r_{11} = \infty$   $d_{11} = 1.500000$  $n_{d6} = 1.49241$  $\nu_{d6} = 57.66$
$r_{12} = \infty$ Zooming Spaces

| f | 5.32 | 8.77 | 14.00 |
|---|---|---|---|
| $d_2$ | 4.0001 | 22.8096 | 36.2482 |
| $d_4$ | 48.891 | 30.0977 | 16.6938 |
| $d_5$ | 4.5416 | 4.1902 | 5.9408 |
| $d_9$ | 3.5181 | 1.6224 | 1.0514 |

Aspherical Coefficients

4th surface $K = -6.783061 \times 10^{-1}$
$A_4 = -1.428861 \times 10^{-5}$
$A_6 = 7.238422 \times 10^{-8}$
$A_8 = -9.512337 \times 10^{-10}$
$A_{10} = 3.069195 \times 10^{-12}$
6th surface $K = 3.333766 \times 10^{-1}$
$A_4 = 9.889182 \times 10^{-4}$
$A_6 = -4.704492 \times 10^{-5}$
$A_8 = 2.179905 \times 10^{-6}$
$A_{10} = -1.865286 \times 10^{-7}$
10th surface $K = 7.002088 \times 10^{-1}$
$A_4 = -8.648023 \times 10^{-8}$
$A_6 = 4.817752 \times 10^{-9}$
$A_8 = -1.701647 \times 10^{-10}$
$A_{10} = 0$

Example 6

$f = 5.90 \sim 9.65 \sim 13.6$
$F_{NO} = 2.80 \sim 2.90 \sim 3.11$
$\omega = 27.4° \sim 17.6° \sim 12.6°$
$f_B = 7.05 \sim 6.90 \sim 5.34$ $r_1 = 351.450000$   $d_1 = 0.000000$  $n_{d1} = 1001.000$  $\nu_{d1} = -3.453391$
$r_2 = 351.515486$   $d_2 = 4.181069$  $n_{d2} = 1.492410$  $\nu_{d2} = 57.66$
$r_3 = -87.874042$   $d_3 = $ (Variable)

-continued $r_4 = -43.191275$  $d_4 = 2.000000 n_{d3} = 1.492410 v_{d3} = 57.66$
$r_5 = 22.482084$ (Aspheric)  $d_5 = $ (Variable)
$r_6 = \infty$ (Stop)  $d_6 = $ (Variable)
$r_7 = -19.6005$ (Aspheric)  $d_7 = 5.823316 n_{d4} = -1.492410 v_{d4} = 57.66$
$r_8 = -5.4527$  $d_8 = $ (Variable)
$r_9 = 71311.9518$ (Aspheric)  $d_9 = 0.000000 n_{d5} = 1001.000 v_{d5} = -3.453391$
$r_{10} = \infty$  $d_{10} = 1.5000 n_{d6} = 1.49241 v_{d6} = 57.66$
$r_{11} = \infty$ Zooming Spaces

| f | 5.90 | 9.65 | 13.60 |
|---|---|---|---|
| $d_3$ | 3.624 | 24.036 | 35.425 |
| $d_5$ | 44.850 | 24.433 | 13.035 |
| $d_6$ | 5.897 | 6.000 | 6.9435 |
| $d_8$ | 5.897 | 3.634 | 3.3822 |

Aspherical Coefficients

5th surface

K = $-1.208196 \times 10^{-1}$
$A_4 = -3.022971 \times 10^{-5}$
$A_6 = 1.215075 \times 10^{-7}$
$A_8 = -1.822351 \times 10^{-9}$
$A_{10} = 5.854865 \times 10^{-12}$ 7th surface K = $3.438465 \times 101$
$A_4 = -1.270915 \times 10^{-3}$
$A_6 = -1.063726 \times 10^{-5}$
$A_8 = -3.587811 \times 10^{-6}$
$A_{10} = -3.862769 \times 10^{-9}$ 9th surface K = $7.367749 \times 10^1$
$A_4 = -1.101516 \times 10^{-7}$
$A_6 = 2.851561 \times 10^{-13}$
$A_8 = 6.154469 \times 10^{-12}$
$A_{10} = 0$ Example 7 f = 5.30~8.60~16.00
$F_{NO}$ = 2.71~2.75~2.84
ω = 30°~19.5°~10.8°
$f_B$ = 8.69~9.13~8.87

$r_1 = 48.219433$  $d_1 = 6.944078 n_{d1} = 1.517277 v_{d1} = 69.56$
$r_2 = 212.231179$  $d_2 = $ (Variable)
$r_3 = -143.65686$  $d_3 = 2.134578 n_{d2} = 1.582672 v_{d2} = 46.39$
$r_4 = 17.998891$ (Aspheric)  $d_4 = $ (Variable)
$r_5 = \infty$ (Stop)  $d_5 = $ (Variable)
$r_6 = -23.185153$ (Aspheric)  $d_6 = 8.328745 n_{d3} = 1.516330 v_{d3} = 64.15$
$r_7 = -9.7073$  $d_7 = $ (Variable)
$r_8 = 25.5867$  $d_8 = 4.434599 n_{d4} = 1.516330 v_{d4} = 64.15$
$r_9 = -19.609329$  $d_9 = $ (Variable)
$r_{10} = 87560.744$ (Aspheric)  $d_{10} = 0.000000 n_{d5} = 1001.000 v_{d5} = -3.453391$
$r_{11} = \infty$  $d_{11} = 1.5000 n_{d6} = 1.49241 v_{d6} = 57.66$
$r_{12} = \infty$ Zooming Spaces

| f | 5.30 | 8.60 | 16.00 |
|---|---|---|---|
| $d_2$ | 1.92130 | 20.95812 | 39.02161 |
| $d_4$ | 47.12811 | 28.12274 | 10.00368 |
| $d_5$ | 4.22036 | 3.81721 | 2.14906 |
| $d_7$ | 2.81446 | 2.68642 | 3.53147 |
| $d_9$ | 3.53461 | 4.19918 | 6.58813 |

Aspherical Coefficients

4th surface

K = $-7.325952 \times 10^{-1}$
$A_4 = 1.517283 \times 10^{-5}$
$A_6 = -2.702726 \times 10^{-7}$
$A_8 = 1.789347 \times 10^{-9}$
$A_{10} = -4.480393 \times 10^{-12}$ 6th surface K = $3.272755 \times 10^1$
$A_4 = -2.146373 \times 10^{-5}$
$A_6 = -4.704492 \times 10^{-5}$
$A_8 = 8.698911 \times 10^{-6}$
$A_{10} = -3.794002 \times 10^{-7}$ 10th surface K = $7.406183 \times 10^1$
$A_4 = -5.336351 \times 10^{-8}$
$A_6 = -3.092109 \times 10^{-9}$
$A_8 = 1.009923 \times 10^{-10}$
$A_{10} = 0$ Tabulated below are the values of conditions (1) to (3) in Examples 1 to 7.

| Example | (1) | (2) | (3) WA | (3) IFL | (3) TE |
|---|---|---|---|---|---|
| 1 | 0.0955 | 0.00 | 0.207 | 0.319 | 0.455 |
| 2 | 0.1724 | 19.71 | 0.227 | 0.279 | 0.359 |
| 3 | 0.0949 | -21.85 | 0.206 | 0.317 | 0.452 |
| 4 | 0.1662 | 19.71 | 0.185 | 0.259 | 0.333 |
| 5 | 0.1140 | -18.33 | 0.09 | 0.149 | 0.238 |
| 6 | 0.0915 | -17.3 | -0.069 | -0.112 | -0.209 |
| 7 | 0.1124 | -24.00 | 0.095 | 0.155 | 0.129 |

WA: at the wide angle end
IFL: at an intermediate focal length
TE: at the telephoto end As can be understood from the above description, the present invention successfully provides a compact and lightweight zoom lens system which, albeit comprising an extremely reduced number of lenses, e.g., 3 or 4 lenses, has a zoom ratio of about 2 to about 3 and an F-number of 2.8.

What I claim is:

1. A zoom lens system which, in order from an object side of said zoom lens system, comprises at least a negative lens group and a first positive lens group and further includes a second positive lens group located between said first positive lens group and an image side of said zoom lens system and including at least one surface having diffractive action substantially rotationally symmetric with respect to an optical axis of said zoom lens system, and in which at least a spacing between said negative lens group and said first positive lens group is varied for zooming wherein said zoom lens system satisfies the following conditions (1) and (2):

$$0.02 \leq f_3/(v_2 f_2) \leq 0.4 \quad (1)$$

$$-25 \leq v_1 - v_2 \leq 20 \quad (2)$$

where $f_2$ is a focal length of said first positive lens group, $f_3$ is a focal length of said surface having diffractive action, $v_1$ is an equivalent Abbe number of said negative lens group, and $v_2$ is an equivalent Abbe number of said first positive lens group.

2. A zoom lens system of claim 1, wherein said negative lens group consists of one negative lens, and said first positive lens group consists of one positive lens.

3. A zoom lens system of claim 1 or 2, which further satisfies the following condition (3):

$$-1 < F/L < 1 \quad (3)$$

where F is a focal length of the overall lens system, and L is a distance from an exit pupil position to said surface having diffractive action.

4. A zoom lens system of claim 1, which satisfies the following conditions (4) and (5):

$$0.08 \leq f_3/(\nu_2 f_2) \leq 0.18 \quad (4)$$

$$-15 \leq \nu_1 - \nu_2 \leq 10 \quad (5).$$

* * * * *